US012720636B2

(12) United States Patent
Bulakci et al.

(10) Patent No.: US 12,720,636 B2
(45) Date of Patent: Aug. 25, 2026

(54) INACTIVE STATE UE CONTEXT HANDLING IN SERVICE-BASED (R)ADIO ACCESS NETWORK

(71) Applicant: Nokia Solutions and Networks Oy, Espoo (FI)

(72) Inventors: Ömer Bulakci, Munich (DE); Subramanya Chandrashekar, Bangalore (IN); Ece Ozturk, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 295 days.

(21) Appl. No.: 18/565,953

(22) PCT Filed: Jul. 14, 2022

(86) PCT No.: PCT/EP2022/069736
§ 371 (c)(1),
(2) Date: Nov. 30, 2023

(87) PCT Pub. No.: WO2023/001683
PCT Pub. Date: Jan. 26, 2023

(65) Prior Publication Data

US 2024/0260122 A1 Aug. 1, 2024

(30) Foreign Application Priority Data

Jul. 19, 2021 (IN) ................................ 20141032386

(51) Int. Cl.
*H04W 76/27* (2018.01)
*H04W 88/08* (2009.01)

(52) U.S. Cl.
CPC .......... *H04W 76/27* (2018.02); *H04W 88/085* (2013.01)

(58) Field of Classification Search
None
See application file for complete search history.

(56) References Cited

U.S. PATENT DOCUMENTS 10,485,051 B2 11/2019 Mildh et al.
11,191,020 B2 * 11/2021 Chen ................. H04W 52/0235
(Continued)

FOREIGN PATENT DOCUMENTS

EP 3927106 A1 12/2021
WO 2020/200118 A1 10/2020
(Continued)

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.5.0, Mar. 2021, pp. 1-151.

(Continued)

*Primary Examiner* — Tuan A Tran
(74) *Attorney, Agent, or Firm* — Harness, Dickey & Pierce, P.L.C.

(57) ABSTRACT

In some example embodiments, there may be provided a data storage function for handling user equipment context information. In some example embodiments, there may be provided a method that includes receiving, from a first network node via a service-based interface, at least one context information for at least one user equipment in a radio resource control inactive state; storing and/or updating the at least one context information; receiving a retrieve request from a second network node via the service-based interface, wherein the retrieve request comprises a context key; retrieving the at least one context information for the at least one user equipment in response to the retrieve request based at least on the context key; and sending the at least one context information for the at least one user equipment to the (Continued)

second network node via the service-based interface. Related systems, methods, and articles of manufacture are also disclosed.

15 Claims, 10 Drawing Sheets

(56) References Cited

U.S. PATENT DOCUMENTS

| | | | | |
|---|---|---|---|---|
| 11,356,879 | B2 * | 6/2022 | Kim | H04W 76/19 |
| 11,445,564 | B2 * | 9/2022 | Palat | H04W 76/19 |
| 11,510,175 | B2 * | 11/2022 | Zeng | H04W 80/08 |
| 11,582,603 | B2 * | 2/2023 | Ryoo | H04W 76/30 |
| 11,622,388 | B2 * | 4/2023 | Jano | H04W 76/28 370/311 |
| 11,678,400 | B2 * | 6/2023 | Gage | H04W 76/30 370/311 |
| 11,729,855 | B2 * | 8/2023 | Mildh | H04W 76/30 370/329 |
| 11,785,454 | B2 * | 10/2023 | Kuge | H04W 12/06 370/329 |
| 11,805,437 | B2 * | 10/2023 | Kim | H04W 76/19 |
| 11,849,507 | B2 * | 12/2023 | Khlass | H04W 76/27 |
| 11,910,465 | B2 * | 2/2024 | Chang | H04W 36/00835 |
| 12,022,554 | B2 * | 6/2024 | Chen | H04W 76/10 |
| 12,035,409 | B2 * | 7/2024 | Kuge | H04W 8/06 |
| 12,225,526 | B2 * | 2/2025 | Kim | H04W 76/20 |
| 12,232,202 | B2 * | 2/2025 | Bedekar | H04W 76/27 |
| 12,295,055 | B2 * | 5/2025 | Talebi Fard | H04W 72/27 |
| 12,317,149 | B2 * | 5/2025 | Kim | H04W 36/305 |
| 12,395,882 | B2 * | 8/2025 | Kim | H04W 52/0209 |
| 12,464,398 | B2 * | 11/2025 | Kim | H04W 76/30 |
| 2020/0037210 | A1 | 1/2020 | Rugeland et al. | |
| 2020/0120474 | A1 | 4/2020 | Chandramouli et al. | |
| 2020/0229069 | A1 | 7/2020 | Chun | |
| 2020/0267539 | A1 | 8/2020 | Tamura et al. | |
| 2021/0212152 | A1 | 7/2021 | Gage et al. | |

FOREIGN PATENT DOCUMENTS

| | | | | |
|---|---|---|---|---|
| WO | 2021/001680 A1 | | 1/2021 | |
| WO | WO 2021/001680 | * | 1/2021 | H04W 76/27 |
| WO | 2022/128125 A1 | | 6/2022 | |

OTHER PUBLICATIONS

"3rd Generation Partnership Project; Technical Specification Group Radio Access Network; NG-RAN; Architecture description (Release 16)", 3GPP TS 38.401, V16.5.0, Apr. 2021, pp. 1-79.

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

"3rd Generation Partnership Project; Technical Specification Group Services and System Aspects; Management and orchestration; Architecture framework (Release 16)", 3GPP TS 28.533, V16.7.0, Mar. 2021, pp. 1-30.

"New Study on Service-based N2", 3GPP TSG SA2 Meeting #145E (e-meeting), S2-2104226, Agenda: 9.1.4, Intel, May 17-28, 2021, 4 pages.

"Msc-generator", Sourceforge, Retrieved on Dec. 11, 2023, Webpage available at : https://sourceforge.net/projects/msc-generator/.

"3rd Generation Partnership Project; Technical Specification Group Radio Access Network; NG-RAN; Xn application protocol (XnAP) (Release 16)", 3GPP TS 38.423, V16.5.0, Apr. 2021, pp. 1-461.

"System architecture milestone of 5G Phase 1 is achieved", 3GPP, Retrieved on Dec. 11, 2023, Webpage available at : https://www.3gpp.org/news-events/3gpp-news/sys-architecture.

"3rd Generation Partnership Project; Technical Specification Group Core Network and Terminals; 5G System; Network Function Repository Services; Stage 3 (Release 17)", 3GPP TS 29.510, V17.2.0, Jun. 2021, pp. 1-256.

"IEEE 802.11", Wikipedia, Retrieved on Dec. 1, 2023, Webpage available at : https://en.wikipedia.org/wiki/IEEE_802. 11.

"IEEE 802.16", Wikipedia, Retrieved on Dec. 1, 2023, Webpage available at : https://en.wikipedia.org/wiki/IEEE_802.16.

"IEEE 802.3", Wikipedia, Retrieved on Dec. 11, 2023, Webpage available at : https://en.wikipedia.org/wiki/IEEE_802.3.

"IEEE 802.15", Wikipedia, Retrieved on Dec. 11, 2023, Webpage available at : https://en.wikipedia.org/wiki/IEEE_802.15.

International Search Report and Written Opinion received for corresponding Patent Cooperation Treaty Application No. PCT/EP2022/069736, dated Nov. 7, 2022, 15 pages.

"3rd Generation Partnership Project; Technical Specification Group Services and System Aspects; System architecture for the 5G System (5GS); Stage 2 (Release 17", 3GPP TS 23.501, V17.1.1, Jun. 2021, pp. 1-526.

* cited by examiner

INACTIVE STATE UE CONTEXT HANDLING IN SERVICE-BASED (R)ADIO ACCESS NETWORK

RELATED APPLICATION

This application claims priority to PCT Application No. PCT/EP2022/069736, filed on Jul. 14, 2022, which claims priority to IN application No. 202141032386, filed on Jul. 19, 2021, each of which is incorporated herein by reference in its entirety.

FIELD

The subject matter described herein relates to wireless communications.

BACKGROUND

Mobile and wireless communications networks are increasingly being deployed in cloud-based platforms. Furthermore, the cellular system, such as 5G and the new generations beyond (e.g., 6G, 7G, and the like), may seek to be flexible by adding new functionalities into the cellular system to capitalize on the cloud-based platforms. For example, cloud-based platforms may enable the use of virtualized functions that are physically hosted at a cloud service provider to enable, for example, flexible and scalable deployments of such functions.

SUMMARY

In some example embodiments, there may be provided a method that includes receiving at a radio access network data storage function, from a first network node via a service-based interface, at least one context information for at least one user equipment in a radio resource control inactive state; storing or updating the at least one context information for the at least one user equipment at the radio access network data storage function; receiving a retrieve request from a second network node via the service-based interface, wherein the retrieve request comprises a context key; retrieving the at least one context information for the at least one user equipment in response to the retrieve request based at least on the context key; and sending the at least one context information for the at least one user equipment to the second network node via the service-based interface.

In some variations, one or more of the features disclosed herein including the following features can optionally be included in any feasible combination. The first network node is the same as the second network node. The first network node and/or the second network node comprises or is comprised in a base station, a centralized unit of the base station, a distributed unit of the base station, and/or a network function. The context key is associated with the at least one context information for the at least one user equipment in the radio resource control inactive state to enable storage and/or retrieval by the radio access network data storage function. The context key comprises an inactive-radio network temporary identifier. The context key comprises an inactive-radio network temporary identifier, a base station identifier, and a distributed unit identifier. The context key is allocated to the at least one user equipment by when the at least one user equipment is moving to the radio resource control inactive state. The inactive-radio network temporary identifier comprises a secured user equipment identifier without comprising address information of a base station. The inactive-radio network temporary identifier comprises a secured user equipment identifier and address information of a base station.

In some example embodiments, there may be provided a method that includes sending, to a radio access network data storage function via a service-based interface, from a centralized unit of a network node at least one context information for at least one user equipment in a radio resource control inactive state; sending, to the radio access network data storage function via the service-based interface, a first retrieve request to retrieve the at least one context information for the at least one user equipment in a radio resource control inactive state, wherein the first retrieve request comprises a context key; and receiving, by the centralized unit of the network node via the service-based interface, the at least one context information from the radio access network data storage function.

In some variations, one or more of the features disclosed herein including the following features can optionally be included in any feasible combination. The network node comprises or is comprised in a base station, and/or a network function. The method may further include sending, to a distributed unit of the network node, a second retrieve request to retrieve at least a portion of the at least one context information for the at least one user equipment, wherein the second retrieve request comprises the context key; and receiving, by the centralized unit of the network node, the at least a portion of the at least one context information for the at least one user equipment from the distributed unit of the network node. The context key is associated with the at least one context information for the at least one user equipment in the radio resource control inactive state to enable storage and/or retrieval by the radio access network data storage function. The context key comprises an inactive-radio network temporary identifier. The context key comprises an inactive-radio network temporary identifier, a base station identifier, and a distributed unit identifier. The context key is allocated to the at least one user equipment, when the at least one user equipment is moving to the radio resource control inactive state. The inactive-radio network temporary identifier comprises a secured user equipment identifier without comprising address information of a base station. The inactive-radio network temporary identifier comprises a secured user equipment identifier and address information of a base station.

In some example embodiments, there may be provided a method that includes sending, to a radio access network data storage function via a service-based interface, from a distributed unit of a network node at least a portion of at least one context information for at least one user equipment in a radio resource control inactive state; sending, to the radio access network data storage function via the service-based interface, a first retrieve request to retrieve the at least a portion of the at least one context information, wherein the first retrieve request comprises a context key; and receiving, by the distributed unit of the network node via the service-based interface, the at least a portion of the at least one context information from the radio access network data storage function.

In some variations, one or more of the features disclosed herein including the following features can optionally be included in any feasible combination. The network node comprises or is comprised in a base station, and/or a network function. The method may further include receiving, a second retrieve request from a centralized unit of the network node, wherein the second retrieve request comprises the context key; retrieving at least a portion of the at least one context information for the at least one user equipment in response to the second retrieve request based at least on the context key; and sending, by the distributed unit of the network node, the at least a portion of the at least one context information for the at least one user equipment to the centralized unit of the network node. The context key is associated with the at least one context information for the at least one user equipment in the radio resource control inactive state to enable storage and/or retrieval by the radio access network data storage function. The context key comprises an inactive-radio network temporary identifier. The context key comprises an inactive-radio network temporary identifier, a base station identifier, and a distributed unit identifier. The context key is allocated to the at least one user equipment, when the at least one user equipment is moving to the radio resource control inactive state. The inactive-radio network temporary identifier comprises a secured user equipment identifier without comprising address information of a base station. The inactive-radio network temporary identifier comprises a secured user equipment identifier and address information of a base station.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1A:
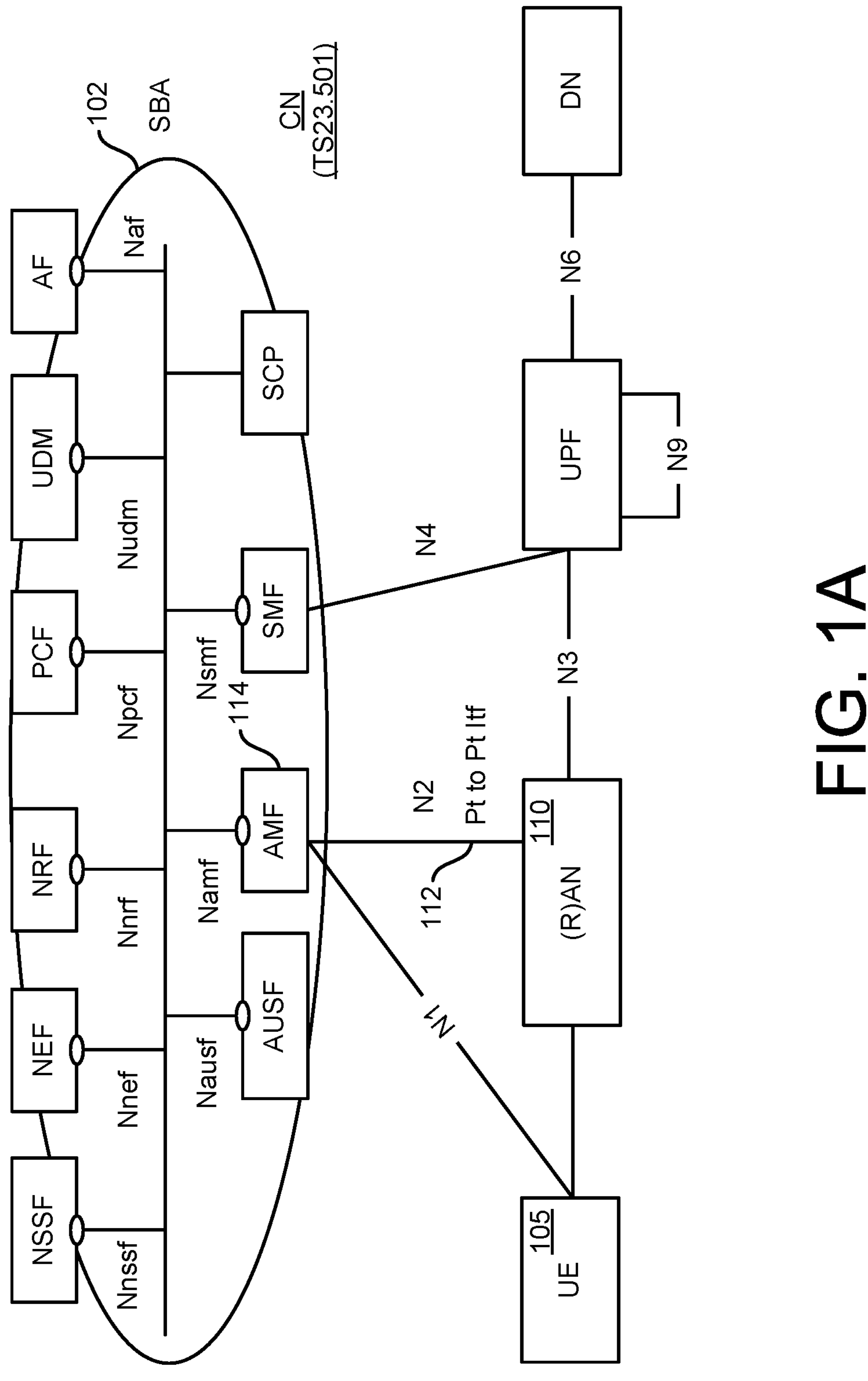
FIG. 1A depicts a core network including interfaces to other functions and nodes in the radio access network, in accordance with some example embodiments.

Like labels are used to refer to same or similar items in the drawings.

DETAILED DESCRIPTION

Figure 1B:
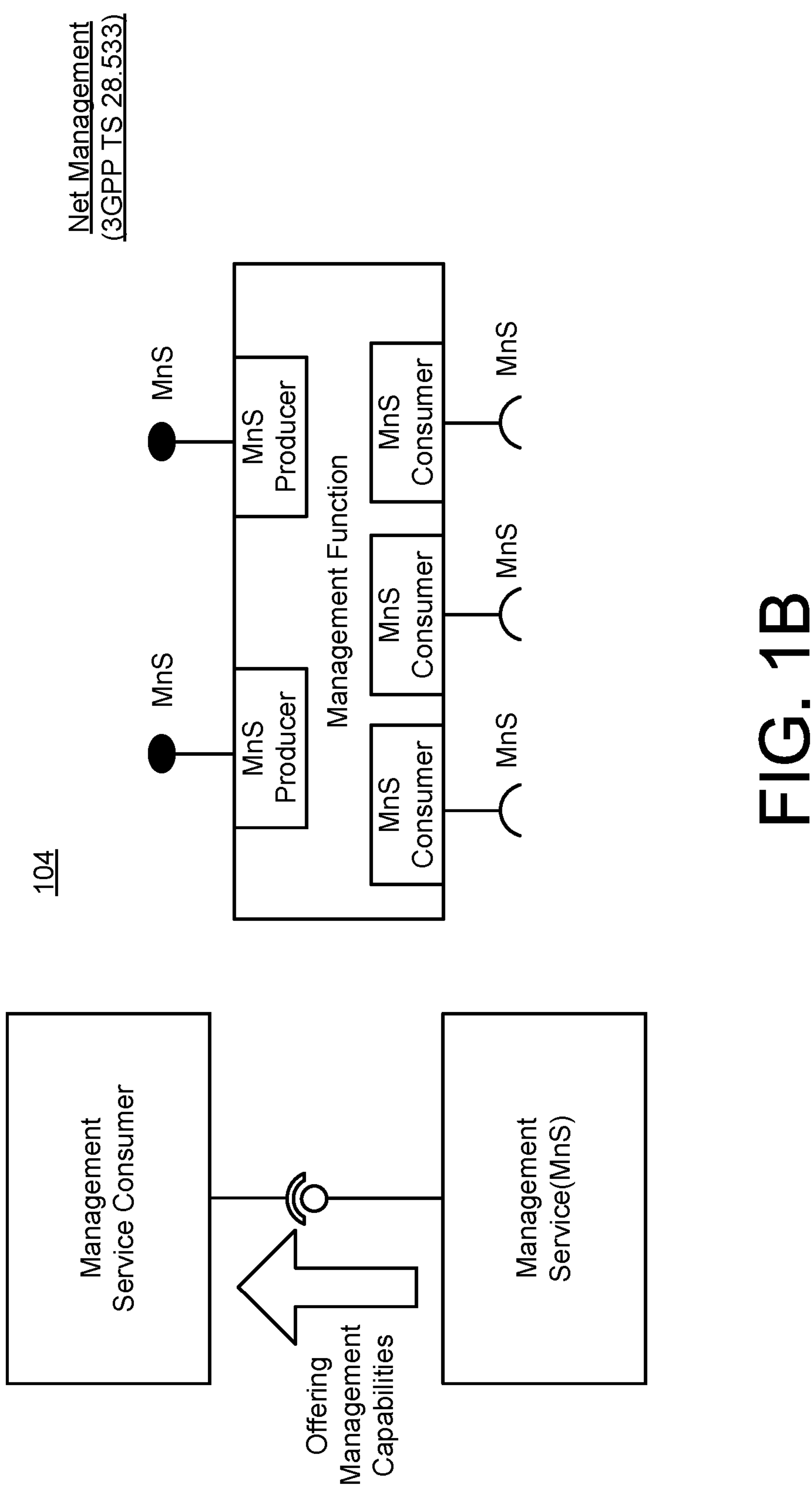
FIG. 1B depicts a service-based management architecture (SBMA) for a cellular system management, in accordance with some example embodiments.

FIG. 1 depicts a core network 102, such as the 5G core, wherein one or more (if not all) of the functions in the 5G core are defined within a service-based (SB) architecture (SBA) which can be implemented in a cloud-based platform and utilizes service-based interfaces (SBI) for exposing and accessing the defined/implemented services (see, e.g., 3GPP TS 23.501). FIG. 1 also shows the network management 104 also employing service-based architecture principles, such as a service-based management architecture (SBMA) (see, e.g., 3GPP TS 28.533). For example, core network functions, such as the network slice selection function (NSSF), network exposure function (NEF), policy control function (PCF), and the like. These network functions (NFs) may be self-contained, independent, and reusable. For example, a network function may provide a service, such as a service provider as well as consume services, such as a service consumer. And, the network function may expose its services through a Service Based Interface (SBI) that employs a well-defined interface (e.g., an application-programming interface (API), a REST API using HTTP(S) also referred to as SBI messaging bus). In the 5G core SBA for example, a consumer may inquire at a network repository function (NRF) in order to discover an appropriate service producer instance. As such, in order to discover and select the appropriate service instances, multiple filtering criteria may be applied by NRF (see, e.g., 3GPP TS 29.510). A network function (NF) service may be considered one type of capability exposed by an NF (e.g., a NF service producer) to other authorized NF (NF service consumer) through a service-based interface (SBI) (see, e.g., 3GPP TS 23.501). The NF may expose one or more NF services. The NF services may communicate directly between the NF service consumers and NF service producers, or indirectly via a service communication proxy (SCP). However, the access network (AN), such as a radio access network (RAN) 110, and the associated interfaces within the access network, among radio access networks, and between the access network and the core network (CN) may continue to be defined in terms of legacy point-to-point (P2P) interfaces, rather than in accordance with a service-based architecture.

In the example of FIG. 1, the N3 interface (which is between the RAN 110 and the core network node UPF (user plane function)) is depicted as a point-to-point interface along with other point-to-point interfaces N2, N4, N6, and N9 interfaces. In the 5G System (5GS) for example, the N2 interface 112 is a 3GPP NG-C Application Protocol over stream control transmission protocol (SCTP), and is between RAN 110 (e.g., a gNB) and an Access and Mobility management Function (AMF) 114 in the core network 102. Within the access network, there are other point-to-point (P2P) interfaces, such as the Xn interface between two base stations (e.g., gNBs), the F1 interface between a central unit (CU) and a distributed unit (DU) in case of a disaggregated base station (gNB), and the E1 interface between the Centralized Unit Control Plane (CU-CP) and the Centralized Unit User Plane (CU-UP) (see, e.g., 3GPP TS 38.401 for a description of the disaggregated gNB including the CU-CP, CU-CP, DU, and the like). The base station may be implemented as a 5G NG-RAN node, a gNB, and/or a future technology base station.

An access network (AN) may refer to a network that offers access (such as radio access) that enables subscribers to connect to one or more core networks. The access network may provide 3GPP access such as GSM/EDGE, UTRA, E-UTRA, or NR (or 5G) radio access or beyond 5G radio access, or non-3GPP access such as WLAN/Wi-Fi). In other words, the radio access network may thus be considered a type of access network. The access network is contrasted with the core network, which is an architectural term relating to the part of the network (e.g. 3GPP network) which is independent of the connection technology of the terminal (e.g. radio, wired) and which provides core network services such as subscriber authentication, user registration, connectivity to packet data networks, subscription management, etc. An access network and a core network may correspond respectively to, for example, a 3GPP access network and 3GPP core network as defined in 3GPP TS 23.501 and TS 38.401.

The application of service-based architecture (SBA) principles to the access network (e.g., the RAN) may also signal a need for substantial updates to the cellular system including mobile and wireless communication networks and, as such, various aspects may be considered to be realized in the next generations beyond 5G.

Figure 2A:
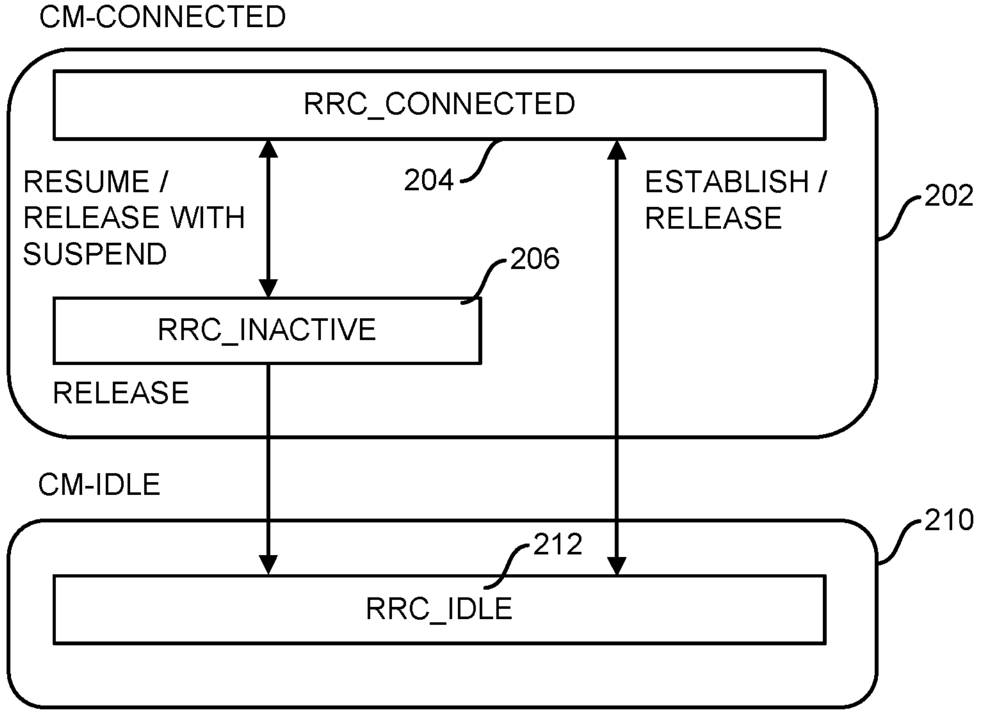
FIG. 2A depicts connection management states, in accordance with some example embodiments.

FIG. 2A depicts connection management in the cellular system including 5G. In the cellular system, there may be two major connection management (CM) states, such as connected (labelled CM-CONNECTED) 202 and idle (labeled CM-IDLE) 210. The radio resource control (RRC) states RRC_CONNECTED 204 and RRC_INACTIVE 206 are considered to be part of (or included in or associated with) the CM-CONNECTED state 202. And, the RRC_IDLE 212 is considered to be part of (or included in) in the CM-IDLE state 210. For example, when the user equipment (UE) 105 is in RRC_CONNECTED state, the UE's 105 context (e.g., UE state information, security information, UE capability information, etc.) is kept by or within the RAN 110 and may be transmitted over a P2P interface, such as the Xn interface (see, e.g., 3GPP TS 38.300) between a source base station (e.g., source gNB) and a target base station (e.g., during mobility events).

There is a benefit of having a UE being kept in RRC_INACTIVE of CM-CONNECTED state when there is no data being transmitted, as both the UE and gNB keep any necessary UE context. This can reduce signaling towards the core network and allow a UE to have very little delay incurred when it needs to transmit or receive data. When the UE is in an RRC_INACTIVE state, the corresponding UE context is kept within the RAN by the last serving gNB. The UE can move within an area configured by RAN (e.g., a RAN notification area) without notifying the RAN. The RAN notification area may cover a single or multiple cells, and may be contained within the core network registration area.

Figure 2B:
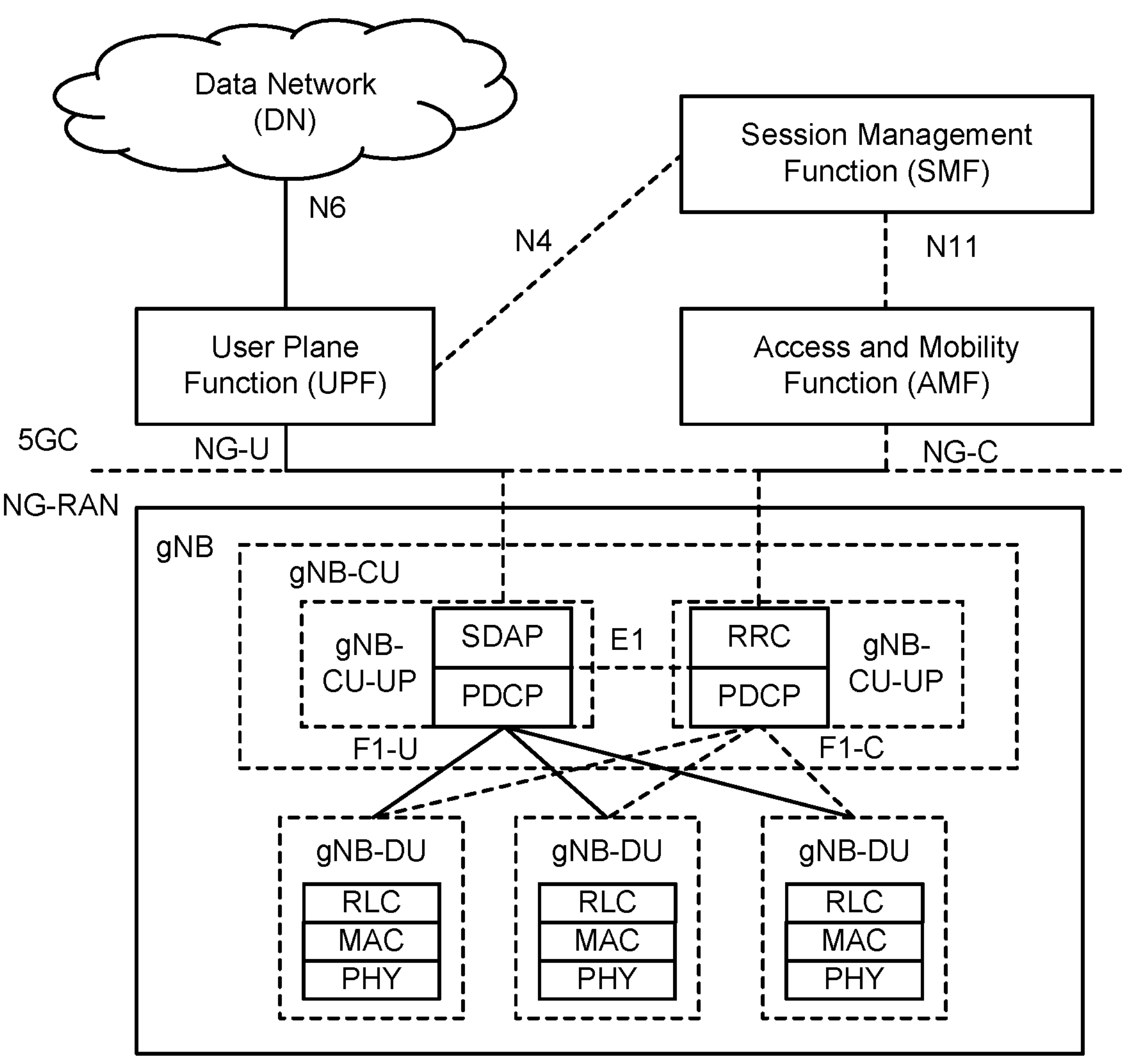
FIG. 2B depicts an overview of a 5G RAN architecture, in accordance with some example embodiments.

FIG. 2B depicts an overview of a 5G (also referred to as new radio (NR)) RAN architecture. The gNB of FIG. 2 may be referred to as a split or distributed base station. For example, the gNB includes a central unit (CU) and distributed units (DU). The gNB CU includes non-time-critical functionalities (which could be hosted on the cloud). The gNB-DUs include real-time functionalities such as radio link control (RLC), medium access control (MAC), and physical (PHY) layer functions. The F1 interface provides control (F1-C) and user (F1-U) plane connectivity between the CU and DU. The F1 interface also provides separation between the radio network and transport network layers, while enabling the exchange of UE and non-UE associated information. The PHY layer may be further separated into higher (PHY-H possibly located in the DU) and lower layer (PHY-L) which could be hosted in a remote radio head (RRH). The interface between these layers would be the latency-critical enhanced Common Public Radio Interface (eCPRI) or xRAN interface.

The RAN UE context, for a UE in RRC INACTIVE state, may be stored in a central entity, such as a distributed gNB (e.g., a centralized unit-control plane (CU-CP) and the centralize-unit-user plane (CU-UP) of a last serving gNB). In case of UE mobility events or small data transmission (SDT), the UE's context within the RAN needs to be available in the 5G-RAN node that the UE has moved to, such as a target gNB base station. This may be performed as a UE context retrieval via an Xn point-to-point interface between the source base station and the target base station in a distributed way. However, the UE context fetch may need to include the source base station identifier (e.g., gNB ID in I-RNTI (Inactive Radio Network Temporary Identity)), which is sent by the UE in the RRC resume request to the target gNB base station (see, e.g., TS 38.300). The I-RNTI is 40 bits in length and includes portions of the UE ID and the gNB ID. The UE ID is 32 bits in length, while the gNB ID is 36 bits in length. Because of the I-RNTI size limitation of 40 bits, some bits from both UE ID and source gNB ID are truncated, which may lead to additional address resolution issues with respect to a prior serving gNB for a UE (e.g., a prior source base station).

Moreover, as the UE context is stored in central entities, the UE's context (e.g., distributed unit (DU) UE context) may be lost when the UE moves to an RRC INACTIVE state, which may cause additional F1 interface and/or E1 interface signaling and latency when UE performs SDT in the current or a different DU. Moreover, a UE context fetch may not even be possible if there is no Xn interface between the target gNB and the last serving gNB, so the UE context cannot be retrieved. For example, this may occur for the target gNBs outside RAN Notification Area (RNA) for the UE.

The RRC resume request (which is transmitted during the random access channel (RACH) procedure as MSG3) cannot be segmented and may thus be transmitted using a single transport block (TB). As such, the RRC resume request message size may be kept relatively small to ensure reliable reception when the UE is at cell edge. Given this size restriction, the inclusion of the full gNB ID in that message for a UE at cell edge may be an issue.

The RAN notification area (RNA) may include a group of cells, or a group of DUs or gNBs. The RNA may be configured by the network on a per UE basis. 5G RAN nodes inside an RNA may be expected to be connected to each other via an Xn interface to ensure context retrieval and paging functionalities. This has a limitation on the configuration of RNAs, as well. RNA is a notional concept in RRC INACTIVE, just to ensure that the UE does not have to communicate with the network while crossing gNB borders, for example. The requirements for 5G-RAN nodes (e.g., gNBs) to be connected via the Xn point-to-point interface also causes a limit to the size of the RNA and corresponding 5G-RAN nodes in the RNA.

In some example embodiments, there is provided a way to store, update and retrieve UE context information for a UE in an inactive state, such as RRC INACTIVE, using a service-based interface (SBI) at the (R)AN employing service-based architecture (SBA) principles (such as SB-(R) AN) according to some example embodiments presented herein.

In some example embodiments, there is provided a (R)AN data storage function (DSF) utilizing a service-based interface (SBI), such that UE context information may be accessed, stored, updated, retrieved, fetched by an authorized (R)AN network entity, network node, logical entity, and/or network function (NF) via the service-based interface rather than a point-to-point interface such as the Xn interface.

Although some of the example embodiments described herein depict and describe the RAN-DSF as a single NF, the RAN-DSF may be implemented as part of a data storage architecture (e.g., a RAN data storage architecture) that may include one or more elements (e.g., functions, logical entities, or nodes). For example, a RAN data storage architecture may include a RAN-DSF, a data repository, and/or a data management entity. Moreover, different deployment options may be implemented, where the elements may be collocated. Furthermore, the elements of the data storage architecture may perform storage and retrieval of data, such as UE context information.

In some example embodiments, the serving gNB may store the UE context information at a (R)AN DSF whenever a UE is transitioned to an inactive state, such as the RRC INACTIVE state.

In some example embodiments, a (R)AN node may be able to discover and consume services provided by (R)AN DSF via service discovery and service request/subscribe service operations. Discovery service operations may be provided by a discovery service API provided by a network entity, network node and/or NF (e.g. network repository function (NRF). Service request/subscribe operations (e.g. UE context retrieve, update, store, notify) may be provided by a service producer (e.g. (R)AN DSF).

Within SB-RAN architecture, the shown entities herein can be in any form that consequently realizes service-based architecture principles. Similarly, the communication among these entities can be performed over interfaces via any communication technology that enables service-based communication. For example, the shown entities can be in the form of (but not limited to) NFs or microservices and the shown procedures can be performed via SBI. Furthermore, for example HTTP(S) can be used for the communications between the network elements/network functions/microservices. Accordingly, the shown information elements can be communicated via HTTP Request and Response messages, e.g., HTTP POST, HTTP GET, HTTP PUT, HTTP PATCH Request messages and the associated HTTP Response messages.

Microservices could be understood as more modular services (as compared with services produced/provided by NFs) that come together to provide a meaningful service/application. In this scope, one can deploy and scale the small modules flexibly (e.g. within a NF or between various NFs). For example, an NF can provide one or more services, and a microservice can represent small modules that make up the services in the NF. Moreover, microservices can communicate with each other, e.g., statelessly.

In some embodiments, a context key at the (R)AN DSF may comprise an I-RNTI configured to the UE and includes only a secured UE ID (i.e., no source gNB address).

Whenever a UE provides the I-RNTI in an RRC resume request to a target gNB, the target gNB may perform a UE context retrieval from the (R)AN-DSF via SBI, in accordance with some example embodiments. This may be applicable for UE mobility and/or small data transmission (SDT) use cases, for example. In some example embodiments, the I-RNTI provided by the UE may not include the gNB address, which reduces the overhead in the RACH message (e.g., MSG3 size of the RRCResumeRequest message). For example, this is useful for RRC_INACTIVE UEs performing RRC Resume from cell edge.

In some example embodiments, the UE context information may be stored in the (R)AN DSF in a per UE category or a per UE group category. For example, a first UE context information may be mapped (e.g., associated with) a single UE, while a second UE context information may be mapped to a group of UEs (e.g., a multi-cast UE group, V2X UE groups, and/or the like).

In some example embodiments, there may be provided a storage and a retrieval services, methods, and/or functions for the UE context information at a DU of a gNB for a UE that is in an RRC INACTIVE state.

When the UE is sent into the RRC INACTIVE state, the UE context information may be released at the distributed unit (DU) of a gNB (e.g., gNB-DU). In some example embodiments, the corresponding DU's UE context information may be stored at the (R)AN-DSF. For example, the UE context store, update and/or fetch service operations may be performed via the CU-CP (see, e.g., FIG. 5) or directly between DU and the RAN-DSF (see, e.g., FIG. 6). In some embodiments, the context Key may comprise the UE's I-RNTI, gNB ID, and DU ID. In some example embodiments, the context key may comprise a NF ID or logical entity ID.

When a UE performs a short and/or small data transmission (SDT) in the same or different DU, the DU may use the UE's context key (e.g., an aggregation of the I-RNTI, gNB ID, and DU ID) to retrieve the UE context information from the (R)AN DSF. This may reduce both the payload in F1 or E1 signaling and the latency involved in establishing the UE context information at the DU before, for example, the SDT data packet can be sent to CU-UP. This can be especially useful either when the UE context store/retrieve services provided by a local (R)AN DSF provide a faster availability or when the SDT is performed in the same DU, since no new updates are required at CU-CP either.

If the UE context information is retrieved in a DU different from a prior serving DU (e.g., the last serving gNB-DU), but belonging to the same RNA, the target DU may send an F1 notification to the serving CU-CP about the UE's presence (as a background task, after the UE is again sent to INACTIVE state).

Figure 3:
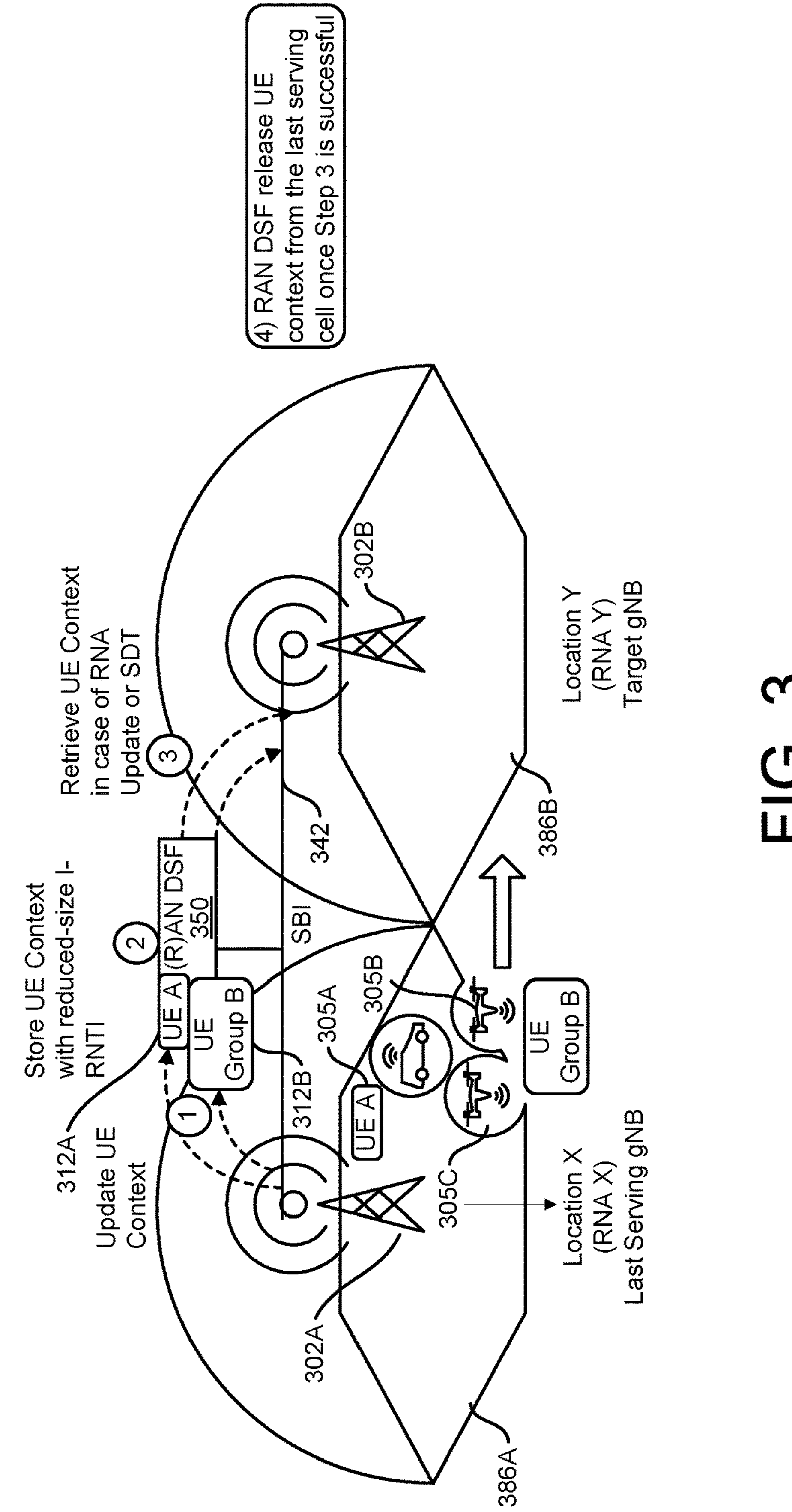
FIG. 3 depicts an example of a system in which a (radio) access network data storage function (DSF) is used to store, retrieve, and update user equipment context information, in accordance with some example embodiments.

FIG. 3 depicts an example of a system 300 including the (R)AN DSF 350, in accordance with some example embodiments. The system 300 further includes a first base station 302A serving in a first RNA 386A including a first UE 305A associated with a first UE context information 312A and a group of UEs 305B-C mapped to a second UE context information 312B.

In the example of FIG. 3, the UE context information may be stored at the (R)AN DSF 350 and updated upon completion of stable state procedure. An authorized network function (NF) may access (e.g., fetch, store, update, etc.) the UE context information at the (R)AN DSF via the SBI interface 342, rather than a point-to-point interface such as the Xn interface. An authorized network function (NF) may perform UE context service operations by using a UE identifier (e.g. I-RNTI). In the example of FIG. 3, the UE context information may be retrieved via the SBI 342 by a new target gNB 302B from the (R)AN DSF 350 when there is an RNA update or SDT (although the retrieval may occur at other times as well). Once the UE context information is retrieved successfully by the target gNB 302B and UE is transitioned to RRC_CONNECTED, the (R)AN DSF may release the UE context information from the last serving cell being served by gNB 302A. In some example embodiments, the first base station 302A and/or the second base station 302B may comprise a split or distributed gNB type base station including a DU and a CU (see, e.g., FIG. 2B).

In some example embodiments, the (R)AN data storage function (DSF) 350 may store UE context information for one or more of the UEs, such as UE 305A and UE 305B-C. Other authorized functions or nodes in the (R)AN may access (e.g., fetch, retrieve, update, etc.) the context information for a UE at the (R)AN DSF.

In the example of FIG. 3, the UE 305A and UEs 350B-C may have UE context information 312A-B stored at the (R)AN DSF 350. At 1, the first base station 302A may update the context information for UE 305A by providing an updated UE context information 312A to the (R)AN DSF 350 and may update the context information for group of UE's 305B-C by providing an updated UE context information 312B to the (R)AN DSF 350.

At 2, the (R)AN DSF may store the UE context, such as UE context information 312A and 312B with a reduced size (e.g. by using only the UE ID and not the gNB ID).

At 3, the second base station 302B (which due to a mobility event is the target base station or target gNB) may retrieve, from (R)AN DSF 350, the updated context information, such as UE context information 312A and/or UE context information 312B. At 4, the (R)AN DSF may release the UE context information from the last serving cell being served by gNB 302A.

Figure 4:
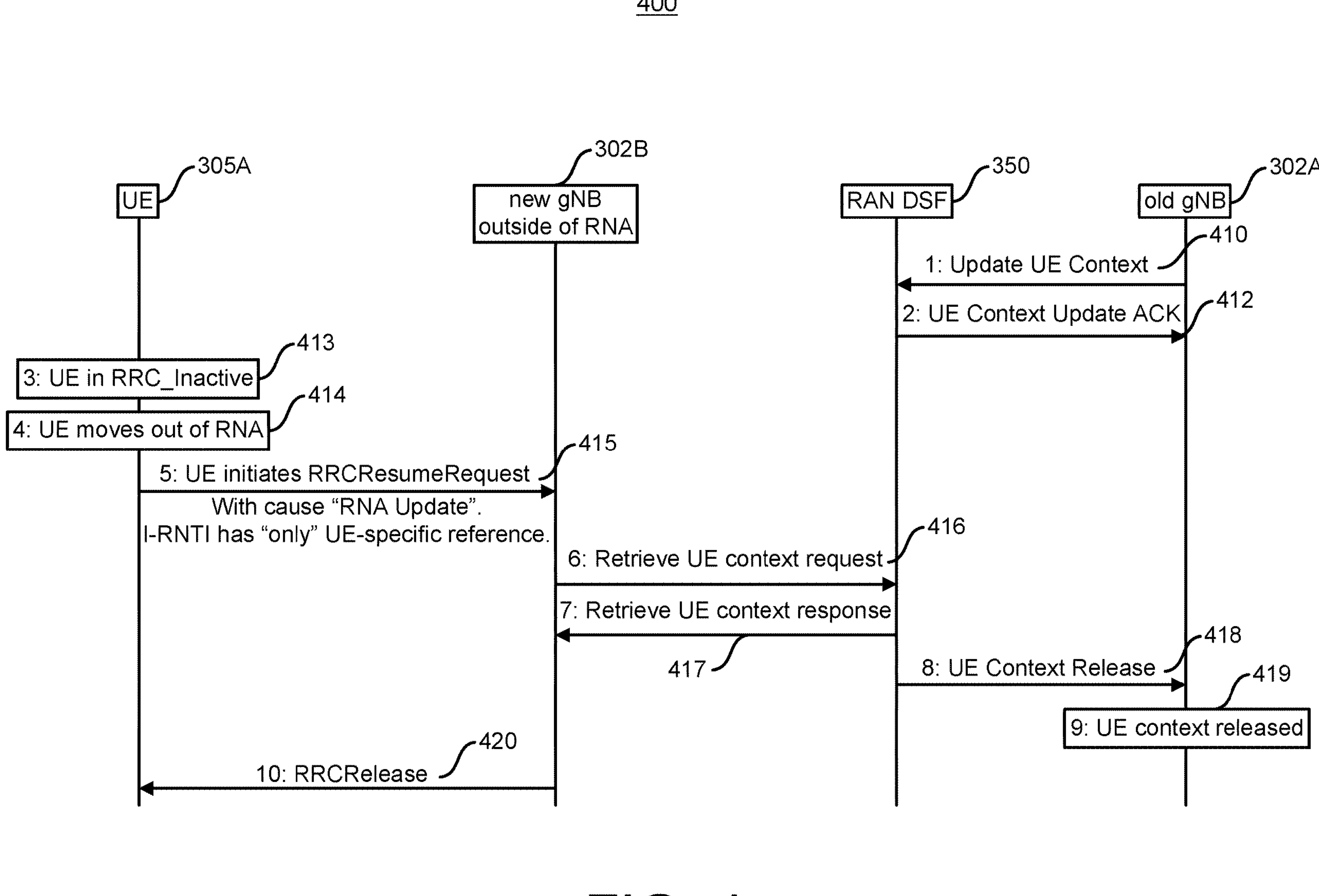
FIG. 4 depicts an example of a process for retrieving the user equipment context information from the (radio) access network data storage function (DSF), in accordance with some example embodiments.

FIG. 4 depicts an example of a process 400 for retrieving UE context information, in accordance with some example embodiments. In the example of FIG. 4, the UE context retrieval is associated with a new gNB, such as the gNB 302B. In other words, after an RNA update from RNA 386A to RNA 386B where new gNB 302B is located, the gNB 302B (which represents the UE 305A's current cell) may retrieve the UE context information from the (R)AN DSF 350.

In the example of FIG. 4, the UE context information is stored at the (R)AN DSF 450 with a context key. In some example embodiments, this context key may be an identifier, such as an aggregation of the I-RNTI, gNB ID, and DU ID). For example, the context key may comprise the I-RNTI plus the gNB ID plus the DU ID.

At 410, the gNB base station 302A may update the UE context stored at the (R)AN DSF 450 over the SBI 342. For example, the UE context information for UE 305A may be updated by sending, via the SBI interface, a message to the RAN DSF 350, so the (R)AN DSF can store the updated UE context information for a given UE. This message may include a context key, such as an identifier, of the stored UE context information being updated.

At 412, the (R)AN DSF 350 may send to the gNB base station 302A an acknowledgement regarding the update of 410. For example, the (R)AN DSF may send via the SBI interface 342 the acknowledgement as a message to the source base station 302A.

At 413, the UE 305A is transitioned into an inactive state, such as the RRC_INACTIVE state, and the UE context information may be stored in (R)AN DSF 350. For example, the gNB 302A may, in response to the UE 305A transitioning into the RRC_INACTIVE state send, via the SBI 342, a message to update the UE context information for the UE 305A to show the RRC_INACTIVE state. As noted, the updated UE context information may be stored at the RAN DSF based on an identifier, such as an aggregation of the I-RNTI, gNB ID, and DU ID). In some example embodiments, the network functions accessing the (R)AN DSF may need to register with the RAN DSF 450 in order to access the (R)AN DSF.

At 414, the UE moves out of RNA 386A (or performs a SDT from a different DU/gNB than the old serving DU/gNB 302A) and moves into the RNA 386B served by gNB 302B. When this is the case, the UE 305A initiates, at 415, an RRCResume Request with a cause indicating "RNA Update." In other words, the reason the UE 305A is becoming active is to update the RNA to 386B. At 415, the I-RNTI may not include the gNB address, so it may be much shorter in size. The I-RNTI may be a full I-RNTI (e.g., with a length of 40 bits which can be included within a 64 bit RRCResumeRequest1 message over Common Control Channel 1) or a short I-RNTI (e.g., with a length of 24 bits which can be included within a 48 bit RRCResumeRequest message Common Control Channel).

At 416, the target gNB 302B may send a retrieve UE context request to the (R)AN-DSF 350. For example, in response to the resume request, the gNB 302B may send a message to the (R)AN DSF to retrieve the UE context information for the UE 305A via the SBI interface 342. At 417, the (R)AN DSF may respond with the UE context information for the UE 305A.

At 418, the (R)AN DSF 350 may send, via the SBI 342, a UE context release message to the gNB 302A as the UE 305A is now being served by the gNB 302B. And, in response to the message at 418, the gNB 302A may release, at 419, the UE context information for the UE 305A. At 420, the gNB 302B may send an RRC release message to the UE 305A to indicate that the UE 305A is again placed in an RRC_INACTIVE state (e.g. after the UE context relocation and/or SDT).

In the process 400, there may be no need to have the UE context release message as the UE context information is maintained in the (R)AN DSF. Although FIG. 4, depicts the use case for UE context retrieval for mobility reasons, process 400 may also be applied to UE context retrieval for an SDT. Moreover, the UE context information may be kept in the last serving gNB until there is a confirmation from the (R)AN DSF 350 that the UE context information is available in the old gNB 302A (e.g., in case UE performs an RRC Resume at gNB 302A and transitions to RRC_CONNECTED).

Figure 5:
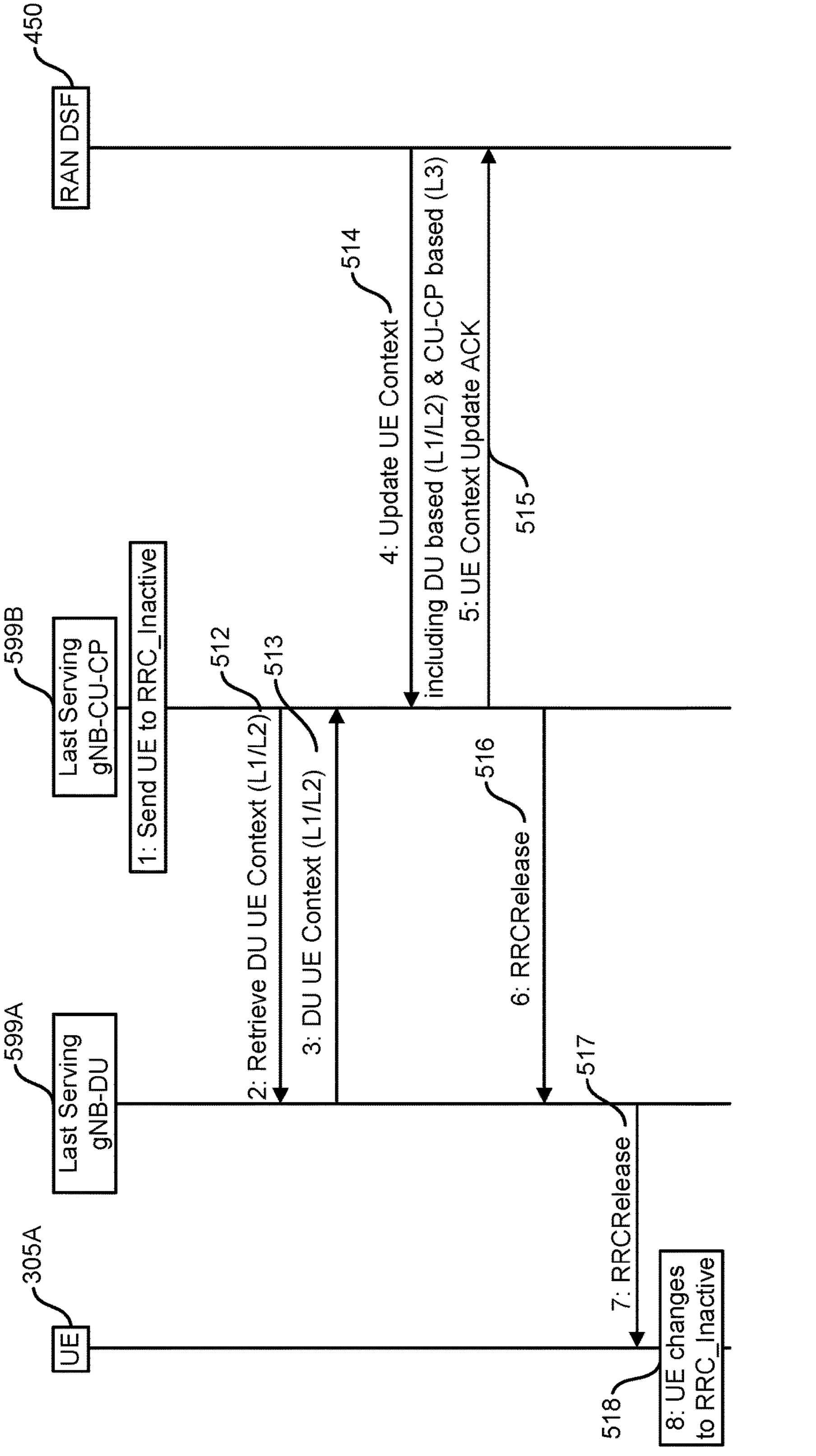
FIG. 5 depicts an example of a process associated with UE context information being updated by a split or distributed base station, in accordance with some example embodiments.

FIG. 5 depicts an example of a process 500 associated with UE context information retrieval from a base station, such as a split base station, a distributed base station and/or a distributed unit of a gNB base station (e.g., gNB-DU).

When the UE is sent into the inactive state, such as the RRC INACTIVE state, the UE context information at the distributed unit of the gNB (e.g., gNB-DU), may be referred to as DU UE context or lower-layers context, may be stored at the (R)AN DSF. For example, the DU UE context store and/or fetch service operations may be performed through the centralized unit (e.g., CU or CU-CP) of the gNB. In some embodiments, the context key may comprise an aggregate or combination of the UE's I-RNTI, gNB ID, and DU ID.

At 510, the gNB 599B (e.g., the gNB's Centralized Unit-Control Plane (gNB-CU-CP)) may decide to move the UE to an inactive state, such as RRC_INACTIVE state. The gNB 599B represents the last gNB-CU-CP to serve UE 305A in this example.

At 512, the gNB 599B (e.g., the gNB-CU-CP) may retrieve from the gNB 599A (e.g., the gNB-DU) the UE's 395 DU UE context. This DU UE context represents the UE's 305A context information. Alternatively, or additionally, the DU UE context includes context information related to physical (PHY) layers, such as L1 and/or L2 layers. The retrieval may be performed via the SBI interface.

At 513, the gNB 599A (e.g., the gNB-DU) sends to the gNB 599B (e.g., the gNB-CU-CP) the DU UE context requested at 512. The DU UE context may be sent via the SBI interface.

At 514, the gNB 599B (e.g., the gNB-CU-CP) may send to the (R)AN DSF 450 an updated UE context information, which further includes the DU UE context (e.g., L1/L2 related information obtained from the DU 599A) and may further include additional context information (e.g., other layer context information, such as L3) for the UE 305A. At 515, the (R)AN DSF may respond to the gNB 599B the successful update of the UE context information for the UE 305A. As noted, processing of the service operation regarding the update of the given UE context information at the (R)AN DSF may be unsuccessful, in which case the (R)AN DSF may send, for example via the SBI interface, to the gNB 599B a response with an appropriate description for the cause of failure.

At 516 and 517, an RRC release message is sent from by gNB-CU-CP 599B towards the UE 517 through gNB DU 599A, and the UE proceeds to enter an RRC_INACTIVE state at 518.

Without the process 500, the DU UE context may be lost once the UE goes to an inactive state. But the DU UE context may be re-used for a UE (e.g., when a UE returns to the same DU, such as in the case of a stationary UE). The DU UE context may include for example, an uplink tunnel identifier (e.g., UL TEID), which can be used for an SDT, for example. Moreover, DUs (other than the last serving DU) may use the DU UE context intelligence (e.g., to enable artificial intelligence and/or machine learning inferences) that is different from the UE context information related to connection information. These other DUs may also use the DU UE context to fetch information about CU-UP address and the UE's SDT bearers while the UE performs SDT, for example.

Figure 6:
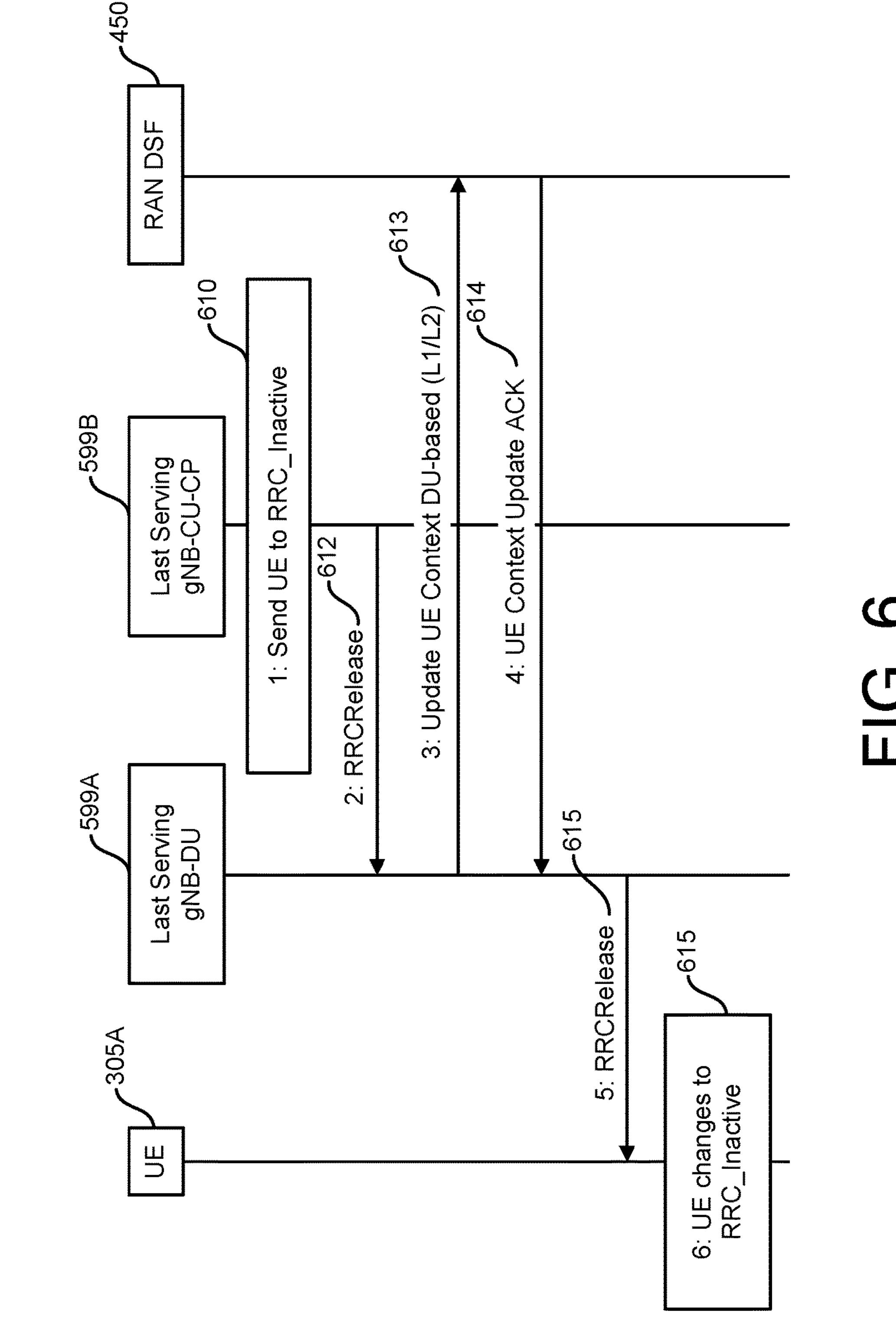
FIG. 6 depicts an example of a process associated with UE context information being updated by a distributed unit (DU) of a split or distributed base station, in accordance with some example embodiments.

FIG. 6 depicts an example of a process 600 associated with UE context information retrieval from a base station, such as a split base station, a distributed base station and/or a distributed unit of a gNB base station (e.g., gNB-DU). Unlike process 500 of FIG. 5, the process 600 provides context information access service operations directly between the DU (e.g., gNB-DU 599A) and the (R)AN DSF 450. In the example of FIG. 6, after the UE 305A transitions to the RRC INACTIVE state, the current DU retrieves the DU UE context and updates it at the (R)AN DSF. This process may reduce the signaling load on the CU-CP and/or delay.

At 610, the gNB 599B (e.g., the gNB-CU-CP) may decide to move the UE 305A to an inactive state, such as RRC_INACTIVE state. The gNB 599B represents the last gNB-CU-CP to serve UE 305A before the UE goes into the inactive state. At 612, the gNB 599B (e.g., the gNB-CU-CP) may send an RRCRelease command to the gNB-DU 599A. This RRC release indicate to the gNB-DU 599A that the UE 305A will go into an inactive state.

At 613, the gNB-DU 599A may send to the (R)AN DSF 450 an updated UE context information, which further includes the DU UE Context (e.g., PHY related information regarding L1 and/or L2), which can be added to the context information already stored at the (R)AN DSF 305 for the UE 305A. At 614, the RAN DSF responds to the context update of 613 to acknowledge the update. At 615, an RRC release message is sent from by gNB-DU 599A towards the UE 305A, and the UE proceeds to enter an RRC_INACTIVE state at 615. As noted, processing of the service operation regarding the update of the given UE context information at the (R)AN DSF may be unsuccessful, in which case the (R)AN DSF may send, for example via the SBI interface, to the gNB 599A a response with an appropriate description for the cause of failure.

Although in the example of FIG. 6, the context storage is illustrated, the UE context fetch (e.g., retrieval) may also be directly performed between the DU 599A and (R)AN DSF 350.

Figure 7A:
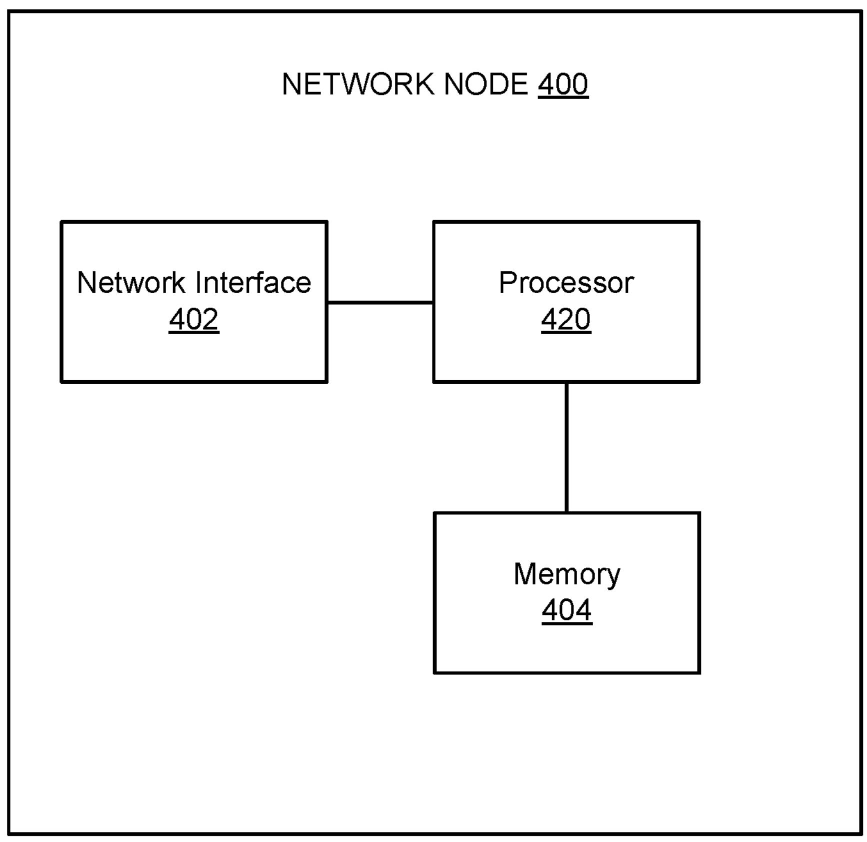
FIG. 7A depicts an example of a network node, in accordance with some example embodiments.

FIG. 7A depicts a block diagram of a network node 400, in accordance with some example embodiments. The network node 400 may comprise or be comprised in one or more network side nodes, network functions (DSF or (R)AN DSF), base stations (e.g., gNB, base stations, DU, CU-CP, and/or the like). The network node 400 may include a network interface 402, a processor 420, and a memory 404, in accordance with some example embodiments. The network interface 402 may include wired and/or wireless transceivers to enable access to other nodes including base stations, other network nodes, the Internet, other networks, and/or any other node. The memory 404 may comprise volatile and/or non-volatile memory including program code, which when executed by at least one processor 420 provides, among other things, the processes disclosed herein with respect to the network nodes.

For example, a network node may be implemented as a DSF, such as the (R)AN DSF. In this example, (R)AN DSF may be configured to receive from a first network node via a service-based interface, at least one context information for at least one user equipment in a radio resource control inactive state; store or update the at least one context information for the at least one user equipment; receive a retrieve request from a second network node via the service-based interface, wherein the retrieve request comprises a context key; retrieve the at least one context information for the at least one user equipment in response to the retrieve request based at least on the context key; and send the at least one context information for the at least one user equipment to the second network node via the service-based interface. The first network node may be the same as the second network node. The first network node and/or the second network node may comprise or be comprised in a base station, a centralized unit of the base station, a distributed unit of the base station, and/or a network function. The context key may be associated with the at least one context information for the at least one user equipment in the radio resource control inactive state to enable storage at, update at and/or retrieval from the radio access network data storage function. The context key may comprise an inactive-radio network temporary identifier. Alternatively or additionally, the context key may comprise an inactive-radio network temporary identifier, a base station identifier, and a distributed unit identifier. The context key may be allocated to the at least one user equipment when the at least one user equipment is moving to the radio resource control inactive state. The inactive-radio network temporary identifier may comprise a secured user equipment identifier without comprising address information of a base station. The inactive-radio network temporary identifier may comprise a secured user equipment identifier and address information of a base station.

The network node may also be configured as a base station, such as a CU-CP of a base station. For example, a centralized unit of a network node may send, to a radio access network data storage function via a service-based interface, the at least one context information for the at least one user equipment in a radio resource control inactive state; send, to the radio access network data storage function via the service-based interface, a first retrieve request to retrieve the at least one context information for the at least one user equipment in a radio resource control inactive state, wherein the first retrieve request comprises a context key; and receive, via the service-based interface, the at least one context information from the radio access network data storage function. The network node comprises or is comprised in a base station, and/or a network function. The centralized unit of a network node may send, to a distributed unit of the network node, a second retrieve request to retrieve at least a portion of the at least one context information for the at least one user equipment, wherein the second retrieve request comprises the context key; and receive the at least a portion of the at least one context information for the at least one user equipment from the distributed unit of the network node. The context key may be associated with the at least one context information for the at least one user equipment in the radio resource control inactive state to enable storage at and/or retrieval from the radio access network data storage function. The context key may comprise at least an inactive-radio network temporary identifier. The context key may comprise at least an inactive-radio network temporary identifier, a base station identifier, and a distributed unit identifier. The context key may be allocated to the at least one user equipment, when the at least one user equipment is moving to the radio resource control inactive state. The inactive-radio network temporary identifier may comprise a secured user equipment identifier without comprising address information of a base station. The inactive-radio network temporary identifier may comprise a secured user equipment identifier and address information of a base station.

The network node may also be configured as a base station, such as a DU of a base station. For example, the distributed unit may send, to a radio access network data storage function via a service-based interface, at least a portion of at least one context information for at least one user equipment in a radio resource control inactive state; send, to the radio access network data storage function via the service-based interface, a first retrieve request to retrieve the at least a portion of the at least one context information, wherein the first retrieve request comprises a context key; and receive, via the service-based interface, the at least a portion of the at least one context information from the radio access network data storage function. The network node may comprises or be comprised in in a base station, and/or a network function. The distributed unit may receive, a second retrieve request from a centralized unit of the network node, wherein the second retrieve request comprises the context key; retrieve at least a portion of the at least one context information for the at least one user equipment in response to the second retrieve request based at least on the context key; and send the at least a portion of the at least one context information for the at least one user equipment to the centralized unit of the network node. The context key may be associated with the at least one context information for the at least one user equipment in the radio resource control inactive state to enable storage and/or retrieval by the radio access network data storage function. The context key may comprise at least an inactive-radio network temporary identifier. The context key may comprise an inactive-radio network temporary identifier, a base station identifier, and a distributed unit identifier. The context key may be allocated to the at least one user equipment, when the at least one user equipment is moving to the radio resource control inactive state. The inactive-radio network temporary identifier may comprise a secured user equipment identifier without comprising address information of a base station. The inactive-radio network temporary identifier may comprise a secured user equipment identifier and address information of a base station.

Figure 7B:
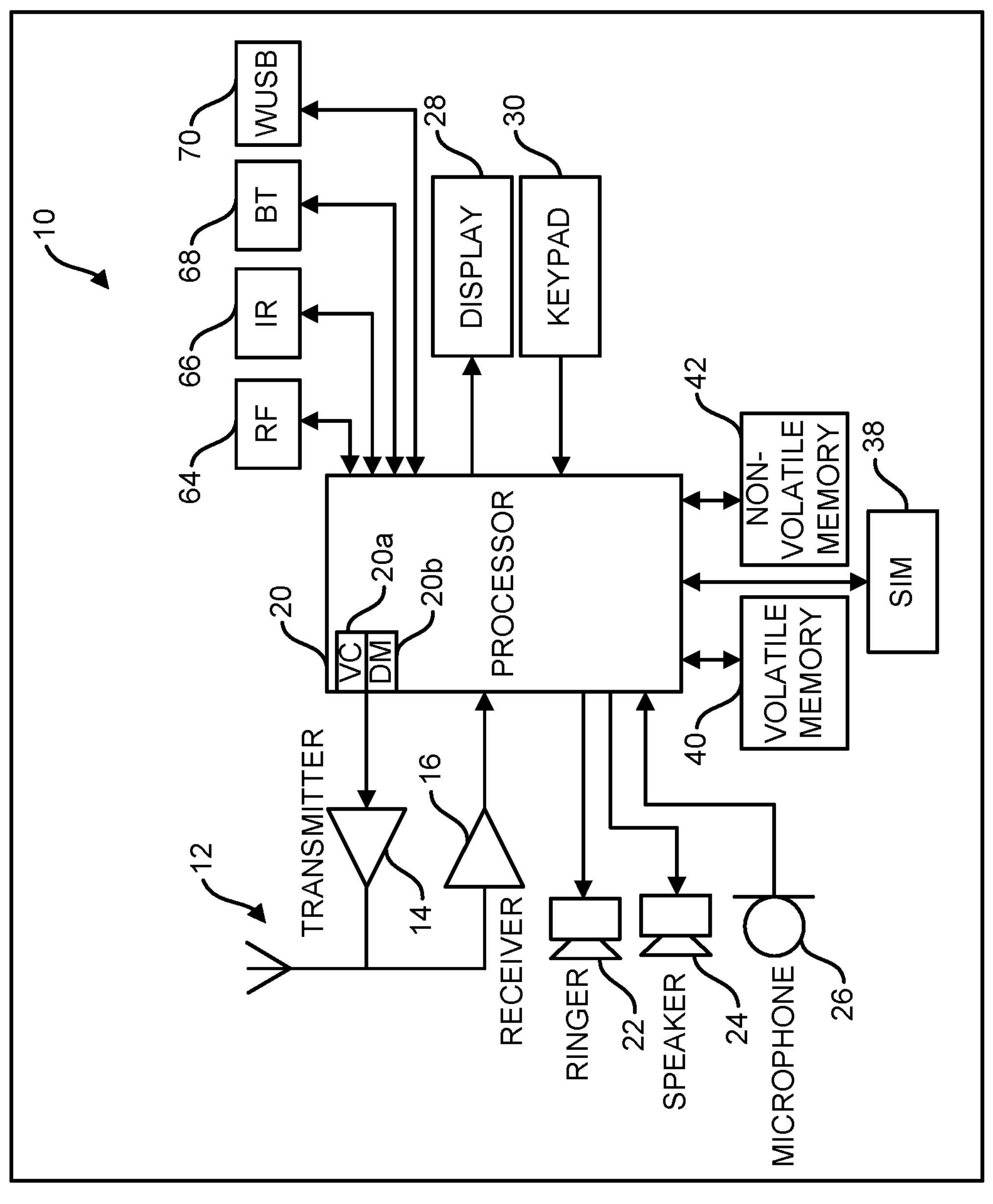
FIG. 7B depicts an example of an apparatus, in accordance with some example embodiments.

FIG. 7B illustrates a block diagram of an apparatus 10, in accordance with some example embodiments. The apparatus 10 may comprise or be comprised in a user equipment, such as user equipment 304. The user equipment may comprise or be comprised in an IoT device, an Industrial IoT device, and/or the like. In the case of an IoT device or IToT device, the UE may be configured to operate with less resources (in terms of for example power, processing speed, memory, and the like) when compared to a smartphone, for example.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 7B as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20*a*, an internal data modem (DM) 20*b*, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 7B, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, U-SIM, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the UE (e.g., one or more of the processes, calculations, and the like disclosed herein including the processes at FIGS. 3A-3B). For example, the apparatus may be configured to receive information including one or more parameters to configure reporting of channel state information for a first reporting type and a second reporting type; determine whether to apply the first reporting type or the second reporting type, wherein the determining is based at least on an indication provided by a network node, the information received to configure the reporting of the channel state information, and/or a predefined rule that defines when to apply the first reporting type or the second reporting type; interpret, based on the determined first reporting type or the determined second reporting type, the information including the one or more parameters to configure reporting of channel state information; and report based on the determined the first reporting type or the second reporting type.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiments, the application logic, software or an instruction set is maintained on any one of various conventional computer-readable media. In the context of this document, a "computer-readable storage medium" may be any non-transitory media that can contain, store, communicate, propagate or transport the instructions for use by or in connection with an instruction execution system, apparatus, or device, such as a computer or data processor circuitry; computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may include: cloud-native service-based (SB) (R)AN architecture; tracking of the UE context in SB-(R)AN architecture in the entire (R)AN; update/retrieval of the UE context in case of the (R)AN events; and/or avoiding a mesh of Xn connections are avoided to enable larger RNAs.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. An apparatus comprising:

at least one processor; and at least one memory including computer program code, the at least one memory and the computer program code configured to, with the at least one processor, cause the apparatus to at least:

receive, from a first network node via a service-based interface, at least one context information for at least one user equipment in a radio resource control inactive state;

store or update the at least one context information for the at least one user equipment in the apparatus;

receive a retrieve request from a second network node via the service-based interface, wherein the retrieve request comprises a context key, wherein the context key comprises, an inactive-radio network temporary identifier, a base station identifier, and a distributed unit identifier;

retrieve the at least one context information for the at least one user equipment in response to the retrieve request based at least on the context key; and send the at least one context information for the at least one user equipment to the second network node via the service-based interface.

2. The apparatus of claim 1, wherein the first network node is the same as the second network node, and/or wherein the apparatus comprises or is comprised in a radio access network data storage function.

3. The apparatus of claim 1, wherein the first network node and/or the second network node comprises or is comprised in a base station, a centralized unit of the base station, a distributed unit of the base station, and/or a network function.

4. The apparatus of claim 1, wherein the context key is associated with the at least one context information for the at least one user equipment in the radio resource control inactive state to enable storage and/or retrieval by the apparatus.

5. The apparatus of claim 1, wherein the context key is allocated to the at least one user equipment when the at least one user equipment is moving to the radio resource control inactive state.

6. An apparatus comprising:

at least one processor; and at least one memory including computer program code, the at least one memory and the computer program code configured to, with the at least one processor, cause the apparatus to at least:

send, to a radio access network data storage function via a service-based interface, at least one context information for at least one user equipment in a radio resource control inactive state;

send, to the radio access network data storage function via the service-based interface, a first retrieve request to retrieve the at least one context information for the at least one user equipment in a radio resource control inactive state, wherein the first retrieve request comprises a context key, wherein the context key comprises, an inactive-radio network temporary identifier, a base station identifier, and a distributed unit identifier; and receive, via the service-based interface, the at least one context information from the radio access network data storage function.

7. The apparatus of claim 6, wherein the at least one memory and the computer program code are configured to, with the at least one processor, further cause the apparatus to:

send, to a distributed unit of a network node, a second retrieve request to retrieve at least a portion of the at least one context information for the at least one user equipment, wherein the second retrieve request comprises the context key; and receive the at least a portion of the at least one context information for the at least one user equipment from the distributed unit of the network node.

8. The apparatus of claim 7, wherein the network node comprises or is comprised in a base station, and/or a network function, and/or wherein the apparatus comprises or is comprised in a centralized unit of a network node.

9. The apparatus of claim 6, wherein the context key is associated with the at least one context information for the at least one user equipment in the radio resource control inactive state to enable storage and/or retrieval by the radio access network data storage function.

10. The apparatus of claim 6, wherein the context key is allocated to the at least one user equipment when the at least one user equipment is moving to the radio resource control inactive state.

11. An apparatus comprising:

at least one processor; and at least one memory including computer program code, the at least one memory and the computer program code configured to, with the at least one processor, cause the apparatus to at least:

send, to a radio access network data storage function via a service-based interface, at least a portion of at least one context information for at least one user equipment in a radio resource control inactive state;

send, to the radio access network data storage function via the service-based interface, a first retrieve request to retrieve the at least a portion of the at least one context information, wherein the first retrieve request comprises a context key, wherein the context key comprises, an inactive-radio network temporary identifier, a base station identifier, and a distributed unit identifier; and receive, via the service-based interface, the at least a portion of the at least one context information from the radio access network data storage function.

12. The apparatus of claim 11, wherein the at least one memory and the computer program code are configured to, with the at least one processor, further cause the apparatus to:

receive, a second retrieve request from a centralized unit of a network node, wherein the second retrieve request comprises the context key;

retrieve at least a portion of the at least one context information for the at least one user equipment in response to the second retrieve request based at least on the context key; and send, the at least a portion of the at least one context information for the at least one user equipment to the centralized unit of the network node.

13. The apparatus of claim 12, wherein the network node comprises or is comprised in a base station, and/or a network function, and/or wherein the apparatus comprises or is comprised in a distributed unit of a network node.

14. The apparatus of claim 11, wherein the context key is associated with the at least one context information for the at least one user equipment in the radio resource control inactive state to enable storage and/or retrieval by the radio access network data storage function.

15. The apparatus of claim 11, wherein the context key is allocated to the at least one user equipment when the at least one user equipment is moving to the radio resource control inactive state.

* * * * *